US 11,455,844 B2

(12) United States Patent
Alla et al.

(10) Patent No.: US 11,455,844 B2
(45) Date of Patent: Sep. 27, 2022

(54) ELECTRICAL DISTRIBUTION SYSTEM MONITORING FOR ELECTRIC AND AUTONOMOUS VEHICLES

(71) Applicant: Ford Global Technologies, LLC, Dearborn, MI (US)

(72) Inventors: Michael Awad Alla, Novi, MI (US); Ahmed Elhadeedy, Ypsilanti, MI (US); Sami Dagher, Dearborn, MI (US); David Celinske, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 16/696,153

(22) Filed: Nov. 26, 2019

(65) Prior Publication Data

US 2021/0158634 A1 May 27, 2021

(51) Int. Cl.
*G07C 5/00* (2006.01)
*G05D 1/00* (2006.01)
*G07C 5/08* (2006.01)

(52) U.S. Cl.
CPC ......... *G07C 5/0808* (2013.01); *G05D 1/0088* (2013.01); *G05D 2201/0213* (2013.01)

(58) Field of Classification Search
CPC ...... G07C 5/0808; G07C 5/0841; G07C 5/00; G05D 1/0088; G05D 2201/0213; G05D 1/00; B60W 30/20; B60W 50/045; B60W 60/00186; B60W 50/0205; B60W 30/00; B60W 50/00; B60R 16/0234
See application file for complete search history.

(56) References Cited

U.S. PATENT DOCUMENTS

| | | | |
|---|---|---|---|
| 9,647,397 B2 | 5/2017 | Du et al. | |
| 9,823,311 B2 | 11/2017 | Stanlake | |
| 10,120,013 B2 | 11/2018 | Klonowski et al. | |
| 2006/0232052 A1* | 10/2006 | Breed | B60R 21/0136 280/735 |
| 2007/0228703 A1* | 10/2007 | Breed | B60R 21/20 280/740 |
| 2017/0372431 A1* | 12/2017 | Perl | G07C 5/085 |
| 2019/0168549 A1* | 6/2019 | Kanbayashi | B60R 16/023 |
| 2020/0117565 A1* | 4/2020 | Ponnuvel | G05D 1/0088 |

(Continued)

*Primary Examiner* — Yonel Beaulieu
(74) *Attorney, Agent, or Firm* — Frank Lollo; Eversheds Sutherland (US) LLP (57) ABSTRACT

The disclosed systems and methods monitor power distribution systems for autonomous and drive-by-wire vehicles. The system can monitor input voltage, current, and other power signals, and reporting the input voltages and currents to a diagnostic engine control unit (ECU). The ECU compares the power signals with real-time (or substantially real-time) waveforms associated with vibrations, acceleration, road bumps, and other phenomena normally encountered in on-road operation, and evaluates any determined correlation between inertial events (e.g., bumps or acceleration, etc.) and changes in the power signals. If the diagnostic ECU determines a correlation between the inertial waveform, the diagnostic ECU map perform mitigating steps, such as issuing a vehicle health warning, generate instructions that cause the vehicle to navigate to a service center, or perform other mitigating actions.

10 Claims, 4 Drawing Sheets

(56) References Cited

U.S. PATENT DOCUMENTS

| | | | |
|---|---|---|---|
| 2020/0202636 A1* | 6/2020 | Andres | G06Q 50/30 |
| 2020/0231168 A1* | 7/2020 | Uthaicharoenpong | B60R 16/0231 |
| 2020/0410790 A1* | 12/2020 | Thompson | G01N 21/8851 |
| 2021/0273469 A1* | 9/2021 | Woll | B60L 3/0038 |
| 2021/0331655 A1* | 10/2021 | So | G06N 3/08 |
| 2022/0028267 A1* | 1/2022 | Bennati | H04W 64/003 |

\* cited by examiner

ELECTRICAL DISTRIBUTION SYSTEM MONITORING FOR ELECTRIC AND AUTONOMOUS VEHICLES

TECHNICAL FIELD

The present disclosure relates to autonomous vehicle fault mitigation, and more particularly, to a system for mitigating electrical wiring and signal fault mitigation.

BACKGROUND

Autonomous and drive-by-wire vehicles rely on key components sharing an electrical distribution system (e.g., connectors, terminals, wiring, circuitry, etc.) to provide aspects of driving and navigation for the vehicle. When the vehicle is in motion, braking, steering, virtual driving, and other vehicle systems rely on a robust electrical distribution that is free of faults associated with open circuitry or other electrical maintenance concerns.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosed systems and methods disclosed may monitor power distribution systems (PDSs) for autonomous and drive-by-wire vehicles. The system can monitor input voltage, current, and other power signals using vehicle control modules connected with the PDS, and reporting the input voltages and currents to a diagnostic engine control unit (ECU), compare the power signals with real-time (or substantially real-time) waveforms associated with vibrations, acceleration, road bumps, and other phenomena normally encountered in on-road operation, and evaluate any determined correlation between inertial events (e.g., bumps or acceleration, etc.) and changes in the power signals. In some aspects, there should be no correlation between inertial events and power signal fluctuations when the PDS is functioning within intended operational parameters. If the diagnostic ECU determines a correlation between the inertial waveform, the diagnostic ECU map may perform mitigating steps, such as issuing a vehicle health warning, generate instructions that cause the vehicle to navigate to a service center, or perform other mitigating actions.

In one example embodiment, the diagnostic ECU may receive the waveform from a restraint control module (RCM) and/or an inertial measurement unit (IMU) of the vehicle, and receive data from an oscillator and wheel speed sensor that indicates vehicle speed, inertial events, and other information. The waveform may include a series of values with respect to time, where the values are associated with vehicle vibrations, inertial events (e.g., hitting a bump in the road), or other events. The diagnostic ECU may execute a correlation function that correlates between the reported vehicle accelerometer vibration waveforms and the input voltage(s) or current waveforms. If the correlation coefficient exceeds a threshold, the diagnostic ECU can set an appropriate diagnostics trouble code (DTC) for service or reports health warning to the vehicle, and may further execute mitigating actions such as navigating the vehicle to a service center based on the fault identification.

Embodiments described in the present disclosure may continuously monitor the critical components operative within an autonomous and drive-by-wire vehicle. Some embodiments may identify intermittent, latent, or situational power distribution system faults, such as open circuitry or wiring and single-point and latent power system issues inside the electrical distribution system (e.g., connectors, terminals, wiring, circuitry, etc.). The monitoring and diagnostic functions may be continuously executed while the vehicle is in motion, which can enhance protections for safety-critical components including, for example, the brake system, steering system, virtual driver system, and other ECUs in the vehicle. Embodiments of the present disclosure may enhance continuity and reliability for wiring and circuits of autonomous vehicle systems, and enhance vehicle safety systems that provide failsafe control components for the vehicle.

These and other advantages of the present disclosure are provided in greater detail herein.

ILLUSTRATIVE EMBODIMENTS

The disclosure will be described more fully hereinafter with reference to the accompanying drawings, in which exemplary embodiments of the disclosure are shown, and not intended to be limiting.

Figure 1:
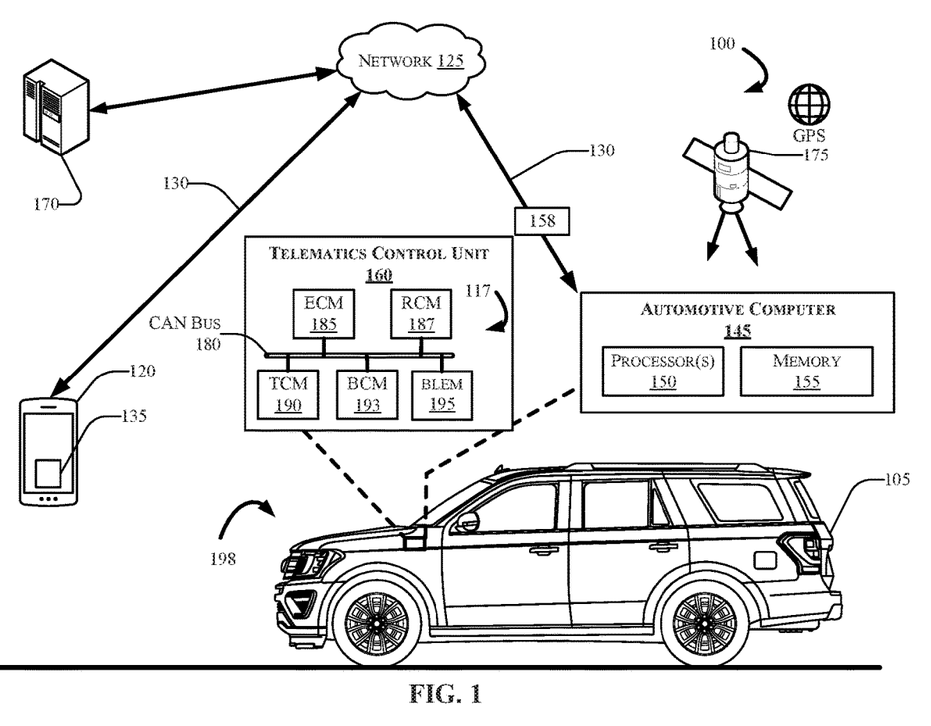
FIG. 1 depicts an example computing environment in which techniques and structures for providing the systems and methods disclosed herein may be implemented.

FIG. 1 depicts an example computing environment 100 that can include a vehicle 105 that includes an automotive computer 145 and a telematics control unit (TCU) 160. The computing environment 100 may also include and a mobile device 120 communicatively coupled with the vehicle 105 via one or more network(s) 125, via one or more wireless channel(s) 130. The mobile device 120 may include one or more application(s) 135.

The vehicle 105 may include an automotive computer 145, which may include one or more processor(s) 150 and memory 155. The Telematics Control Unit (TCU) 160, which may be disposed in communication with and/or be a part of the automotive computer 145. The TCU 160 may, in some example embodiments, be disposed in communication with the mobile device 120, one or more server(s) 170, which may be associated with and/or include a Telematics Service Delivery Network (SDN). The vehicle 105 may also receive and/or be in communication with a Global Positioning System (GPS) 175.

Although illustrated as a sport utility vehicle, the vehicle 105 may take the form of another passenger or commercial automobile such as, for example, a car, a truck, a crossover vehicle, a van, a minivan, a taxi, a bus, etc. Although described herein as an autonomous vehicle, the vehicle 105 may be a drive-by-wire, a manually driven vehicle, and/or be configured to operate in a fully autonomous (e.g., driverless) mode or partially autonomous mode.

In some aspects, the mobile device 120 may communicate with the vehicle 105 through the one or more channel(s) 130, which may be encrypted and established between the mobile device 120 and the TCU 160. The mobile device 120 may communicate with the TCU 160 using a wireless transmitter (not shown in FIG. 1) associated with the TCU 160 onboard the vehicle 105. The transmitter may communicate with the mobile device 120 using a wireless communication network such as, for example, the one or more network(s) 125. The wireless channel(s) 130 are depicted in FIG. 1 as communicating via the one or more network(s) 125.

The one or more network(s) 125 illustrate an example of one communication infrastructure in which the connected devices may communicate. The one or more network(s) 125 may be and/or include the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The TCU 160 may provide a software and hardware infrastructure for performing aspects of the present disclosure. For example, the TCU 160 can provide communication and control access for two or more Electronic Control Units (ECUs) 117 using a Controller Area Network (CAN) bus 180.

The CAN bus 180 may be configured as a multi-master serial bus standard for connecting two ECUs as nodes using a message-based protocol that can be configured and/or programmed to allow the ECUs 117 to communicate with each other in applications. The CAN bus 180 may be or include a high speed CAN (which may have bit speeds up to 1 Mb/s on CAN, 5 Mb/s on CAN Flexible Data Rate (CAN FD)), and can include a low speed or fault tolerant CAN (up to 125 Kbps), which may use a linear bus configuration. In some aspects, the ECUs may communicate with a host computer (e.g., the automotive computer 145 and/or the server(s) 170, etc.), and may also communicate with one another without the necessity of a host computer. The CAN bus 180 may connect the ECUs 117 with the automotive computer 145 such that the automotive computer 145 may retrieve information from, send information to, and otherwise interact with the ECUs 117 to perform steps described according to embodiments of the present disclosure. The CAN bus 180 may connect CAN bus nodes (e.g., the ECUs 117) to each other through a two-wire bus, which may be a twisted pair having a nominal characteristic impedance.

The ECUs 117, when configured as nodes in the CAN bus 180, may each include a central processing unit, a CAN controller, and a transceiver (not shown in FIG. 1). In an example embodiment, the ECUs 117 associated with the TCU 160 can include an Engine Control Module (ECM) 185, a Restraint Control Module (RCM) 187, a Transmission Control Module (TCM) 190, a Body Control Module (BCM) 193, and/or a Bluetooth Low-Energy Module (BLEM) 195. In some aspects, the TCU 160 may control aspects of the vehicle 105 through the control modules 180-195, and implement one or more instruction sets received from the application 135 operating on the mobile device 120. It should be appreciated by those skilled in the art that vehicles routinely include many ECUs to control aspects of vehicle operation, the number of which far exceeding the number of example ECUs described herein. The ECUs 117 are described for exemplary purposes only, and are not intended to be limiting or exclusive. Control and/or communication with other control modules not shown is possible, and such control is contemplated.

The automotive computer 145 may include one or more processor(s) 150 and a computer-readable memory 155. The automotive computer 145 may be installed in an engine compartment of the vehicle 105 (or elsewhere in the vehicle 105) as part of a vehicle power distribution system 198 in accordance with the disclosure. The automotive computer 145 may include, in one example, the one or more processor(s) 150, and a computer-readable memory 155. In other example embodiments, the TCU 160 may be integrated with and/or be incorporated with the automotive computer 145. For the sake of simplicity, the computing system architecture of the automotive computer 145 may omit certain computing modules. It should be readily understood that the computing environment depicted in FIG. 1 is one example of an implementation according to the present disclosure, and thus, it should not to be considered limiting or exclusive.

The one or more processor(s) 150 may be disposed in communication with one or more memory devices (e.g., the memory 155 and/or one or more external databases (not shown in FIG. 1). The one or more processor(s) 150 may utilize the memory 155 to store programs in code and/or to store data for performing a correlation steps, and generating vehicle maintenance instructions in response to correlations between vehicle characteristics represented in a waveform, and voltage and/or current values as determined by the TCU 160. For example, in an example embodiment, the automotive computer 145 may be configured as a diagnostic ECU (e.g., the diagnostic ECU 245 shown with respect to FIG. 2). The memory 155 may be a non-transitory computer-readable memory. The processor(s) 150 may be configured to execute computer-executable instructions stored in the memory 155 for performing various functions of the power distribution system 198, as well as for performing vehicle control functionalities in accordance with the disclosure. Consequently, the memory 155 may be used for storing code and/or data code and/or data for performing operations in accordance with the disclosure.

The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc. The memory 155 may be one example of a non-transitory computer-readable medium, and may be used to store programs in code and/or to store data for performing various operations in accordance with the disclosure. The instructions in the memory 155 can include one or more separate programs, each of which can include an ordered listing of computer-executable instructions for implementing logical functions. In another exemplary implementation, some or all components of the automotive computer 145 may be shared with the TCU 160.

The memory 155 may store various code modules such as, for example, a secure communication controller (not shown in FIG. 1) for establishing the one or more channel(s) 130 (which may, in some embodiments, be encrypted channel(s)) between the mobile device 120, the TCU 160, and/or the automotive computer 145. The memory 155 may also receive the one or more instruction sets 158 for issuing maintenance instructions to the vehicle 105. For example, in one embodiment, the server(s) 170 may receive one or more messages from the TCU 160, where the message(s) indicate that there is a fault occurring in the vehicle power distribution system 198. In some aspects, the server(s) 170 may issue one or more instructions that cause the vehicle 105 to navigate to a service center for maintenance. In another aspect, the vehicle 105 may generate vehicle maintenance instructions that cause the vehicle 105 to navigate to a maintenance facility in response to an instruction or message from the server(s) 170.

Figure 2:
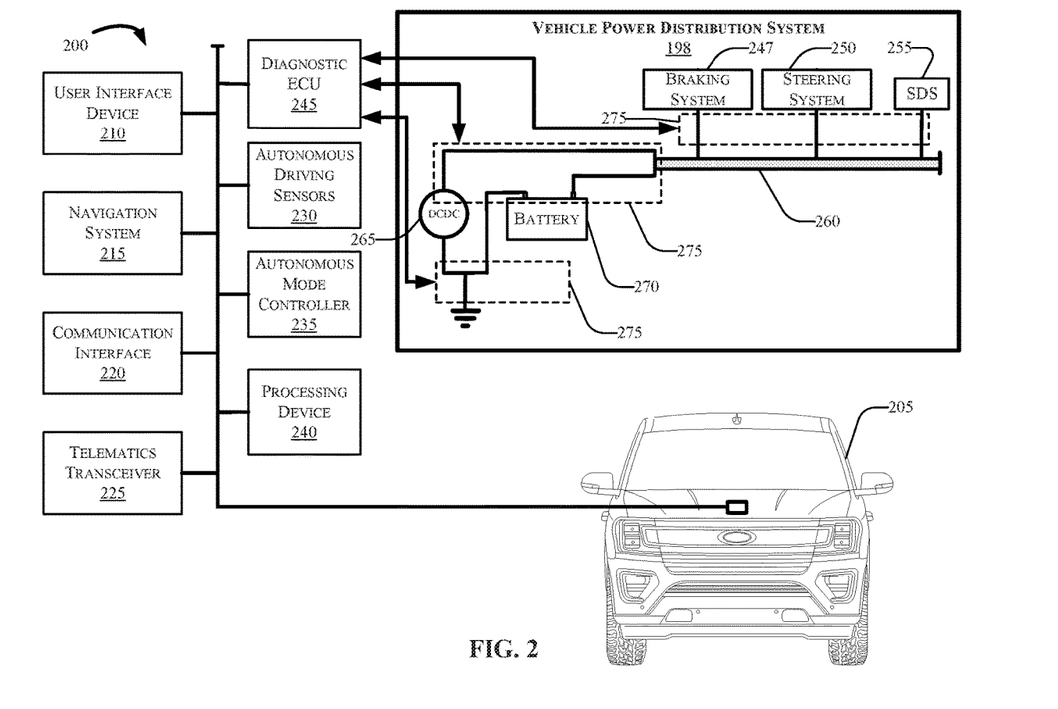
FIG. 2 is a functional schematic of an example control system that may for use in an autonomous vehicle in accordance with the present disclosure.

FIG. 2 illustrates example functional schematic of a control system 200 that may be configured for use in an autonomous vehicle (AV) 205. The AV 205 may be similar or identical to the vehicle 105 as shown with respect to FIG. 1. The control system 200 can include a user interface 210, a navigation system 215, a communication interface 220, autonomous driving sensors 230, an autonomous mode controller 235, and one or more processing device(s) 240. The control system 200 may further include a diagnostic engine control unit (ECU) 245, which may be disposed in communication with the vehicle power distribution system 198. It should be appreciated that the control system 200 is depicted as a functional schematic that embodies various functions of the TCU 160 (described with respect to FIG. 1). For the sake of simplicity, the control system architecture 200 may also omit certain computing architectures and controlling modules, such as the CAN bus 180, the ECM 185, the TCM 190, and the BCM 193, which were described with respect to FIG. 1. It should be readily understood that the computing environment 100 and the control system 200, as respectively depicted in FIGS. 1 and 2, are examples of implementations according to the present disclosure, and thus, are not to be considered limiting or exclusive.

The user interface 210 may be configured or programmed to present information to a user (not shown in FIG. 2) during operation of the AV 205. Moreover, the user interface 210 may be configured or programmed to receive user inputs, and thus, it may be disposed in or on the AV 205 such that it is viewable and may be interacted with by a passenger or operator. For example, where the AV 205 is a passenger vehicle, the user interface 210 may be in a passenger compartment. In one approach, the user interface 210 may include a touch-sensitive display screen (not shown in FIG. 2), which may output one or more messages indicative of a vehicle fault associated with the vehicle power distribution system 198.

The navigation system 215 may be configured and/or programmed to determine a position of the vehicle 105. The navigation system 215 may include a Global Positioning System (GPS) receiver configured or programmed to triangulate the position of the AV 205 relative to satellites (e.g., the GPS 175 as depicted in FIG. 1) or terrestrial based transmitter towers (not shown in FIG. 2). The navigation system 215 may therefore be configured or programmed for wireless communication.

The navigation system 215 may be further configured or programmed to develop routes from a current location to a selected destination, as well as display a map and present driving directions to the selected destination via, e.g., the user interface. For example, responsive to determining that the acceleration characteristics correlates with the voltage value, the diagnostic ECU 245 may generate one or more instructions to navigate the AV 205 to a repair facility using an autonomous vehicle control system (e.g., the navigation system 215, the communication interface 220, the telematics transceiver 224, the autonomous driving sensors 230, the autonomous mode controller 235, etc.). In some instances, the navigation system 215 may develop the route according to a user preference. Examples of user preferences may include maximizing fuel efficiency, reducing travel time, travelling the shortest distance, or the like.

The communication interface 220 may be configured or programmed to facilitate wired and/or wireless communication between the components of the AV 205 and other devices, such as a remote server (not shown in FIG. 2), or another vehicle (not shown in FIG. 2) when using a vehicle-to-vehicle communication protocol. The communication interface 220 may also be configured and/or programmed to communicate directly from the AV 205 to another device using any number of communication protocols such as Bluetooth®, Bluetooth® Low-Energy, or Wi-Fi.

A telematics transceiver 225 may include wireless transmission and communication hardware that may be disposed in communication with one or more transceivers associated with telecommunications towers and other wireless telecommunications infrastructure (not shown in FIG. 2). For example, the telematics transceiver 225 may be configured and/or programmed to receive messages from, and transmit messages to one or more cellular towers associated with a telecommunication provider, and/or and a Telematics Service Delivery Network (SDN) associated with the AV 205 (such as, for example, the server(s) 170 depicted with respect to FIG. 1). In some examples, the SDN may establish communication with a mobile device (e.g., the mobile device 120 as depicted with respect to FIG. 1), which may be and/or include a cell phone, a tablet computer, a laptop computer, a key fob, or any other electronic device. An internet connected device such as a PC, Laptop, Notebook, or Wi-Fi connected mobile device, or another computing device may establish cellular communications with the telematics transceiver 225 through the SDN.

The communication interface 220 may also communicate using one or more vehicle-to-vehicle communications technologies. An example of a vehicle-to-vehicle communication protocol may include, for example, a dedicated short-range communication (DSRC) protocol. Accordingly, the communication interface 220 may be configured or programmed to receive messages from and/or transmit messages to a remote server (e.g., the server(s) 170 depicted with respect to FIG. 1) and/or other autonomous, semi-autonomous, or manually-driven vehicles (not shown in FIG. 2).

The autonomous driving sensors 230 may include any number of devices configured or programmed to generate signals that help navigate the AV 205 while the AV 205 is operating in the autonomous (e.g., driverless) mode. Examples of autonomous driving sensors 230 may include a radar sensor, a lidar sensor, a vision sensor, or the like. The autonomous driving sensors 230 may help the AV 205 "see" the roadway and the vehicle surroundings and/or negotiate various obstacles while the vehicle is operating in the autonomous mode.

The autonomous mode controller 235 may be configured or programmed to control one or more vehicle subsystems while the vehicle is operating in the autonomous mode. Examples of subsystems that may be controlled by the autonomous mode controller 235 may include one or more systems for controlling braking, ignition, steering, acceleration, transmission control, and/or other control mechanisms. The autonomous mode controller 235 may control the subsystems based, at least in part, on signals generated by the autonomous driving sensors 230.

In one embodiment, the system control unit (SCU) 280 associated with the diagnostic ECU 245 may be disposed in communication with various ECUs (e.g., the ECUs 117 shown in FIG. 1), such as those associated with a vehicle braking system 247, steering system 250, and a self-driving system (SDS) 255, among other systems. Power distribution components such as the power bank 270, the direct current converter (DCDC) 265, among others, may provide and control power to the various vehicle systems. In an example embodiment, the vehicle power distribution system 198 may use the diagnostic ECU 245 to ensure that the wiring, connection, and terminals are able to deliver the required power to the safety critical components, such as the SDS 255, braking system 247, power bank 270, and self-driving system (SDS) 255. Accordingly, the vehicle power distribution system 198 may prevent latent faults or single point failures to the connection systems.

Figure 3:
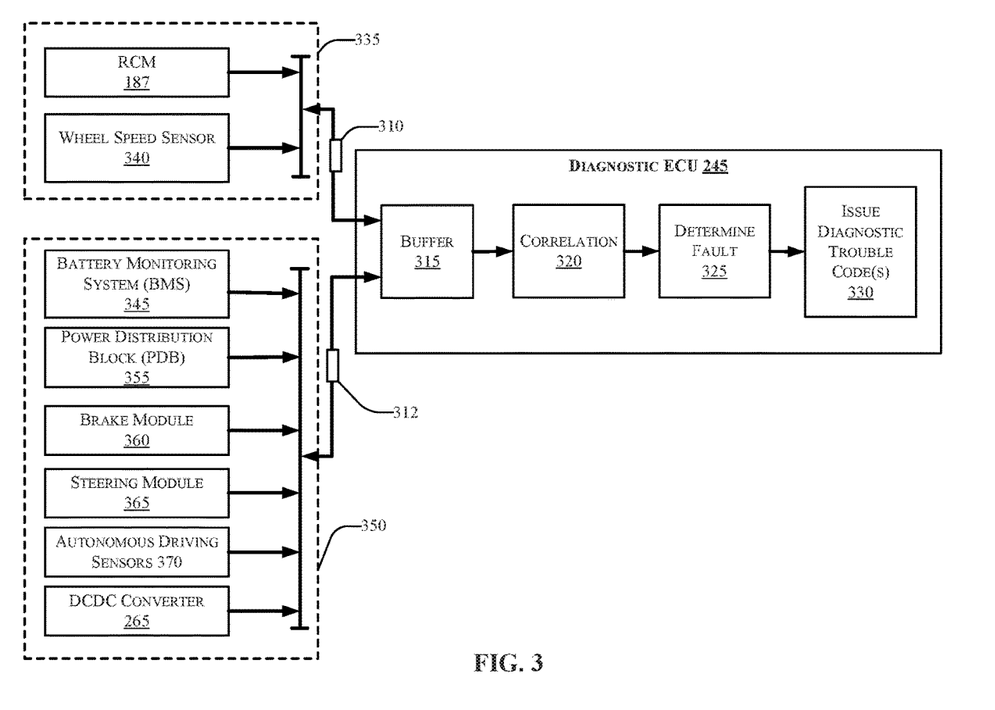
FIG. 3 illustrates an exemplary automotive control system that may be installed in an engine compartment of a vehicle in accordance with the present disclosure.

FIG. 3 illustrates a functional schematic of the diagnostic ECU 245 that may be used to perform aspects of the present disclosure. The diagnostic ECU 245 may include a computer-readable memory buffer 315 (hereafter "buffer 315"). For example, the control unit 280 may be similar or identical to the automotive computer 145 described with respect to FIG. 1, where the buffer 315 may be functional as a component of the memory 155 and/or the processor(s) 150. The diagnostic ECU 245 may utilize the memory to store programs in code and/or to store data for performing various operations in accordance with the disclosure.

An Input/Output (I/O) interface (not shown) may be configured to receive signals from various sources such as sensors and transducers of the AV 205. A few such exemplary sensors are shown in FIG. 3. For example, the diagnostic ECU may receive inertial information 310 from one or more motion sensors 335, which may include, for example, the RCM 187, and a wheel speed sensor 340. The I/O interface of the diagnostic ECU 245 (not shown in FIG. 3) may also receive power information 312 from the power distribution system components 350 being monitored, which may include a battery monitoring system (BMS) sensor 345, the power distribution block (PDB) 395, a brake module 360, a steering module 355, any of the autonomous driving sensors 370, and/or the DCDC converter 265. The power information 312 may include voltage information, current information, time information, date information, etc.

In one aspect, the vehicle ECUs 117 may monitor their own input voltage(s) and current(s) signals, which may be saved by the respective ECUs in the form of time-sequenced waveforms indicative of voltage samples and/or current samples over time. In one embodiment, the ECUs 117 may report the information to the diagnostic ECU 245 by transmitting the data over one or more channels to the diagnostic ECU 245, in real or substantially real time, as the AV 205 is driving.

The inertial information 310, received by the buffer 315, may include one or more vehicle acceleration waveforms indicative of an acceleration characteristic of the vehicle. The acceleration characteristic may include information that indicates a change of AV 205 speed with respect to time, a change of angular velocity of the AV 205, changes of momentum, or other information. The buffer 315 may also receive the power distribution system signals received from the power distribution system components 350, and execute a correlation function 320 using the inertial information 310 and the power information 312, to determine a possible correlation between changes in inertial data and changes in the power information. In one example, the diagnostic ECU 245 may perform an autocorrelation procedure on the inertial information 310, and perform second autocorrelation procedure on the power information, and determine whether a relationship exists between the power signal and the acceleration signal. A correlation that exceeds a threshold value may indicate that there is a fault 325, which may include a latent or intermittent problem in the power distribution system of the AV 205. Responsive to determining that there is a fault 325, the diagnostic ECU 245 may issue a trouble code 330. A trouble code may indicate a particular ECU of the ECUs 117 associated with the fault. In some aspects, the diagnostic ECU 245 may determine the particular diagnostic trouble code (DTC) appropriate for responding to a fault identified by the diagnostic ECU 245. In one aspect, a fault that could result in a loss of power, a partial loss of power, or other situation that could alter a core functionality of the AV 205 such as braking, acceleration, steering, navigation, etc., may result in issuance of instructions by the diagnostic ECU 245 that causes the AV 205 to navigate to a service center.

Figure 4:
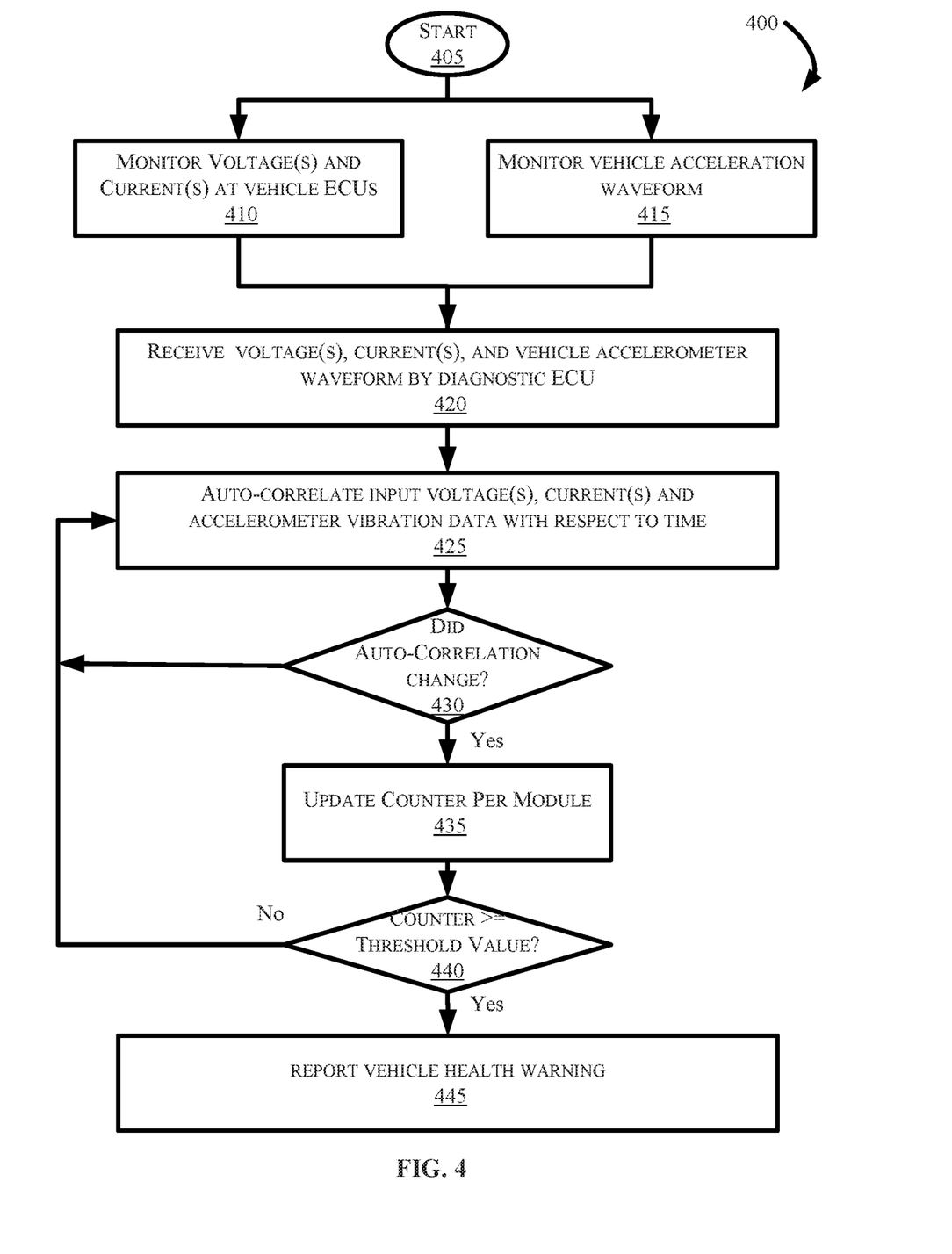
FIG. 4 is a flow diagram of an example method in accordance with the present disclosure.

FIG. 4 is a flow diagram of an example method 400 for diagnosing an electrical distribution system fault, according to the present disclosure. FIG. 4 may be described with continued reference to prior figures, including FIGS. 1-3. The following process is exemplary and not confined to the steps described hereafter. Moreover, alternative embodiments may include more or less steps that are shown or described herein, and may include these steps in a different order than the order described in the following example embodiments.

Referring first to FIG. 4, at step 405, the method 400 may commence with a starting step 405, which may be triggered by powering on a vehicle (e.g., the vehicle 105, the AV 205, etc.), or engaging one or more drive motor(s) of the vehicle. Next, the method includes a step of monitoring voltage(s) and current(s) at the vehicle ECUs (step 410). The method also includes a step of monitoring vehicle acceleration via the vehicle ECUs (step 415).

At step 420, the method 400 may further include receiving voltages, currents, and a vehicle accelerometer waveform by the diagnostics ECU.

At step 425, the diagnostics ECU may correlate input voltages, currents, and the accelerometer vibration data with respect to time.

At step 430, the accelerometer may determine whether the autocorrelation values have changed, which may indicate that there is a correlation between input voltages, input currents, and the accelerometer information.

At step 435, the accelerometer may update a counter associated with a count of a number of autocorrelation coefficient incidents that have exceeded a predetermined threshold for correlation. For example, if the correlation associated with a particular ECU exists more than a threshold number of times given a similar set of circumstances, it may be indicative that a latent fault exists in the corresponding ECU and/or the connectivity of the ECU to the power distribution system. In another aspect, if the count does not exceed a predetermined threshold, then the anomaly may not be indicative of a fault.

Responsive to determining that the count does exceed the predetermined threshold, then the anomaly indicates a fault. Accordingly, at step 445, the diagnostic ECU may report the vehicle health warning.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A computer-implemented method, comprising:
   receiving a voltage value from an engine control unit (ECU) in a power distribution system for a vehicle;
   receiving a vehicle acceleration waveform indicative of an acceleration characteristic;
   determining that the acceleration characteristic correlates with the voltage value, comprising:
      determining a correlation coefficient value associated with the acceleration characteristic and the voltage value,
      comparing the correlation coefficient value with a threshold value for correlation, and
      determining the correlation associated with the acceleration characteristic and the voltage value when the correlation coefficient value exceeds the threshold value for correlation,
      updating, based on determining that the correlation coefficient value exceeds the threshold value, a counter associated with the ECU; and
   generating, based on determining that the acceleration characteristic correlates with the voltage value, a diagnostic trouble code (DTC) that indicates a fault in the power distribution system.

2. The computer-implemented method according to claim 1, further comprising issuing instructions to navigate the vehicle to a repair facility using an autonomous vehicle control system.

3. The computer-implemented method according to claim 1, further comprising:
   receiving a current value from the ECU;
   receiving a vehicle acceleration waveform indicative of an acceleration characteristic; and
   determining that an acceleration characteristic correlates with the voltage value.

4. The computer-implemented method according to claim 1, further comprising generating vehicle maintenance instructions that cause the vehicle to navigate to a maintenance facility.

5. The computer-implemented method according to claim 1, wherein receiving the vehicle acceleration waveform comprises receiving the vehicle acceleration waveform from a Restraint Control Module (RCM).

6. A system, comprising:
   a processor; and
   a memory for storing executable instructions, the processor configured to execute the instructions to:
      receive a voltage value from an engine control unit (ECU) in a power distribution system for a vehicle;
      receive a vehicle acceleration waveform indicative of an acceleration characteristic;
      determine that the acceleration characteristic correlates with the voltage value;
      compare a correlation coefficient value with a threshold value for correlation;

determine the correlation associated with the acceleration characteristic and the voltage value when the correlation coefficient value exceeds the threshold value for correlation;

update, based on determining that the correlation coefficient value exceeds the threshold value, a counter associated with the ECU; and generate, based on determining that the acceleration characteristic correlates with the voltage value, a diagnostic trouble code (DTC) that indicates a fault in the power distribution system.

7. The system according to claim 6, further comprising issuing instructions to navigate the vehicle to a repair facility using an autonomous vehicle control system.

8. The system according to claim 6, wherein the processor is further configured to execute the instructions to:
receive a current value from the ECU;
receive a vehicle acceleration waveform indicative of an acceleration characteristic; and
determine that an acceleration characteristic correlates with the voltage value.

9. The system according to claim 6, wherein the processor is further configured to execute the instructions to:
generate vehicle maintenance instructions that cause the vehicle to navigate to a maintenance facility.

10. The system according to claim 6, wherein the processor is further configured to execute the instructions to:
receive the vehicle acceleration waveform from a Restraint Control Module (RCM).

* * * * *